C. H. McCormick,
Harvester Cutter.

No. 2653  
33657

Patented Nov 5, 1861

UNITED STATES PATENT OFFICE.

CYRUS H. McCORMICK, OF CHICAGO, ILLINOIS.

IMPROVEMENT IN METALLIC FINGER-BEAMS OF REAPING AND MOWING MACHINES.

Specification forming part of Letters Patent No. 33,657, dated November 5, 1861.

*To all whom it may concern:*

Be it known that I, CYRUS H. MCCORMICK, of Chicago, in the county of Cook and State of Illinois, have invented certain new and useful Improvements in Metallic Finger-Beams of Reaping and Mowing Machines, of which the following is a full, clear, and exact description, reference being had to the accompanying drawings, making part of this specification, in which—

Figure 1:
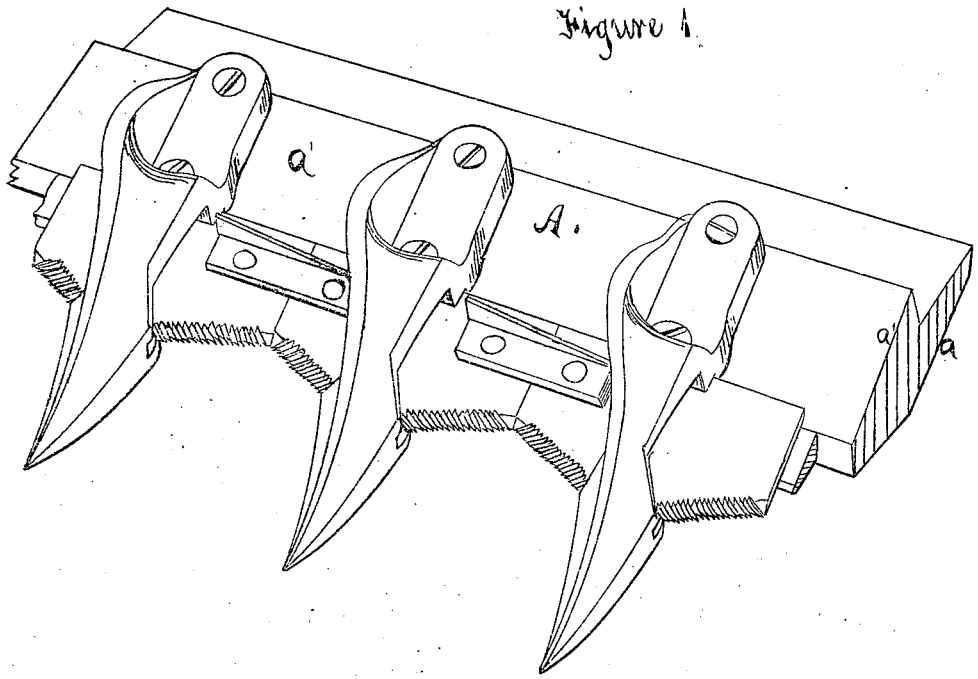
Figure 2:
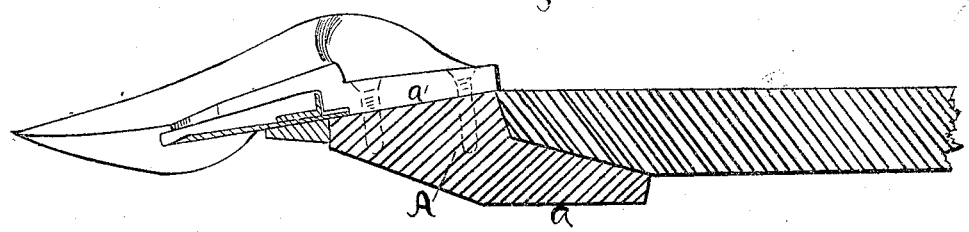

Figure 1 represents a view in perspective of a portion of my improved finger-beam, with fingers and a piece of the cutter fitted thereto; and Fig. 2 represents a transverse section of the same.

In mowing wet meadows the finger-beam, if of the ordinary rectangular form in its cross section, unless made so broad as to be very heavy and unwieldy, has too narrow a bearing or sole to rest upon, and is liable to indent or sink into the surface of the ground, increasing the draft of the machine and carrying the cutter so low as to endanger the cutting of the roots of the grass and killing it. To avoid these objections I have contrived a finger-beam with a broad under surface to prevent it from sinking too much into the ground, with a narrow upper surface, sloping toward the front, as a seat for the fingers, and to allow cut grass readily to fall over it to the ground, while the requisite vertical stiffness is obtained by giving it additional thickness in the line of the rivet-holes to prevent the latter from reducing its strength too much. The rear portion of the finger-beam is depressed and made thin, and projects backward like a flange, to give a broad under surface, and forms a convenient ledge for the front edge of the platform to rest on when the machine is fitted for reaping.

The finger-beam A (represented in the accompanying drawings) should be made of wrought or cast iron, and I prefer the former, with a broad lower side or sole, $a$, inclining upward from about its middle to its forward edge, and with a wide rib, $a'$, on the front portion of its upper side, which rib thickens from its front toward its rear edge. The top of the rib is flat to form a broad and firm seat for the shanks of the fingers, which rest upon it, and it is pierced with a series of holes for the rivets, which fasten the fingers to the beam. The rear portion of the beam is made comparatively thin, that its increase of breadth to give it the requisite bearing-surface may not so materially increase its weight.

The sole may be made, as represented, in a transverse direction, or it may be curved throughout its entire breadth, or at its rear edge only. The latter form in some cases is advantageous in facilitating the backing of the machine.

The finger-beam, if made of wrought-iron, may be made in the same manner as railroad-rails and other bars of irregular cross-section, by means of rolls of a proper shape. If made of cast-iron, it will of course be by molding and casting in the usual manner in which iron castings of a similar character are usually made. I prefer to make the bar solid in the first place, and then to pierce the rivet-holes with a drill, whether the bar be of wrought or cast metal, as the bar thus made is more likely to be free from cracks, seams, cold-shorts, cavities, and flaws of all kinds than if the rivet-holes were formed by forging, casting, or cold-punching.

What I claim as my invention, and desire to secure by Letters Patent, is—

The finger-beam constructed as herein set forth.

In testimony whereof I have hereunto subscribed my name.

C. H. McCORMICK.

Witnesses:
F. W. WENTWORTH,
WM. T. POOLE.